(12) United States Patent
Moeller et al.

(10) Patent No.: US 9,557,550 B2
(45) Date of Patent: Jan. 31, 2017

(54) MICROSCOPE DEVICE AND METHOD FOR OPERATING A MICROSCOPE DEVICE

(71) Applicant: Carl Zeiss Microscopy GmbH, Jena (DE)

(72) Inventors: Gerhard Moeller, Gottingen (DE); Steffen Leidenbach, Reinhausen (DE); Michael Wacke, Gottingen (DE); Becky Hohman, Ridgewood, NJ (US)

(73) Assignee: Carl Zeiss Microscopy GmbH, Jena (DE)

( * ) Notice: Subject to any disclaimer, the term of this patent is extended or adjusted under 35 U.S.C. 154(b) by 498 days.

(21) Appl. No.: 13/921,249

(22) Filed: Jun. 19, 2013

(65) Prior Publication Data

US 2013/0342901 A1 Dec. 26, 2013

(30) Foreign Application Priority Data

Jun. 21, 2012 (DE) .................. 10 2012 012 276

(51) Int. Cl.
*G02B 21/00* (2006.01)
*G02B 21/02* (2006.01)
*G02B 21/36* (2006.01)

(52) U.S. Cl.
CPC ........... *G02B 21/025* (2013.01); *G02B 21/365* (2013.01)

(58) Field of Classification Search
CPC ..... G02B 21/025; G02B 21/22; G02B 21/265; G02B 21/0076; G02B 21/0012

(Continued)

(56) References Cited

U.S. PATENT DOCUMENTS 6,327,032 B1 12/2001 Lajeunesse et al.
7,688,503 B2 * 3/2010 Hermann ........... G02B 21/0012
359/368

(Continued)

FOREIGN PATENT DOCUMENTS

DE 225237 A1 7/1985
DE 68918614 T2 5/1995

(Continued)

*Primary Examiner* — Bumsuk Won
*Assistant Examiner* — Tamara Y Washington
(74) *Attorney, Agent, or Firm* — Hoffman Warnick LLC

(57) ABSTRACT

The invention relates to a method for operating a microscope device having a first and a second zoom microscope, wherein a zoom adjustment of the second zoom microscope is carried out in dependence upon a zoom adjustment of the first zoom microscope. It is provided according to this method that, in order to set a determined magnification ratio between the zoom microscopes, the zoom adjustment of the second zoom microscope is automatically carried out on the basis of a coupling function or that, in order to carry out a size comparison between specimens brought into beam paths of the two zoom microscopes, the zoom adjustment of the first zoom microscope and the zoom adjustment of the second zoom microscope are carried out as desired by a user and a magnification ratio between the zoom adjustments carried out is determined in dependence upon these zoom adjustments and on the basis of a coupling function, through which an assignment of zoom adjustments of the first zoom microscope to zoom adjustments of the second zoom microscope is produced. In addition the invention relates to a microscope device with two zoom microscopes.

16 Claims, 2 Drawing Sheets

(58) Field of Classification Search
USPC ...... 359/380, 372–378, 432; 250/200, 201.1, 250/201; 600/101, 160, 162, 166, 167, 168
See application file for complete search history.

(56) References Cited

U.S. PATENT DOCUMENTS

2004/0004762 A1  1/2004  Bruehl et al.
2009/0180177 A1* 7/2009  Gilbert ............. G01N 21/95607
                                                          359/373

FOREIGN PATENT DOCUMENTS

| | | |
|---|---|---|
| DE | 10312471 A1 | 12/2004 |
| DE | 102011078515 A1 | 1/2012 |
| EP | 1293927 A2 | 3/2003 |
| EP | 1416308 A1 | 5/2004 |

* cited by examiner

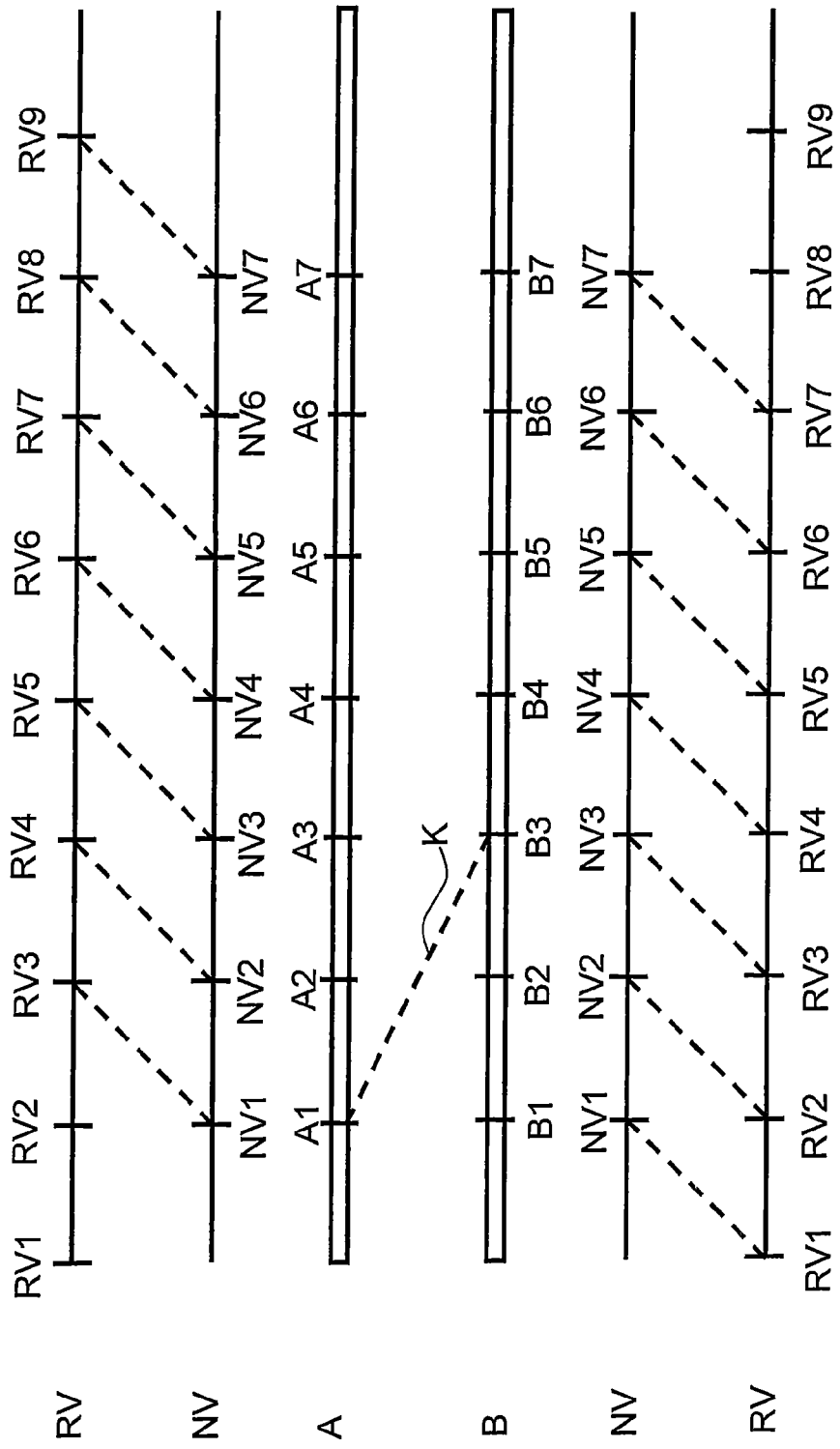

MICROSCOPE DEVICE AND METHOD FOR OPERATING A MICROSCOPE DEVICE

TECHNICAL FIELD

The present invention relates in a first aspect to a method for operating a microscope device.

According to a second aspect the invention relates to a microscope device.

RELATED ART

In a generic method for operating a microscope device with a first and a second zoom microscope, a zoom adjustment of the second zoom microscope is carried out in dependence upon a zoom adjustment of the first zoom microscope.

A generic microscope device comprises a first and a second zoom microscope. Different zoom adjustments with different magnifications can be carried out independently of each other using the first and second zoom microscope.

In such microscope devices the beam paths of the two zoom microscopes are brought together via a comparison bridge. The two microscope images of the two zoom microscopes can thereby be observed with the same ocular or conveyed into the same camera channel. The two microscope images hereby lie one on top of the other and it is possible to select via diaphragms for example which sections of the two microscope images lying one on top of the other are conveyed into the ocular or the camera channel.

A main field of application of such microscope devices is forensics. In this field two projectiles are examined for example with the two zoom microscopes in order to ascertain whether they come from the same gun. It may be required for evidence purposes to carry out a comparison by means of observation through an ocular. A sequential observation of two projectiles with only a single zoom microscope is thereby excluded.

For a comparison of the microscope images of the two zoom microscopes it is necessary in the case of conventional microscope devices for the zoom adjustments of the two zoom microscopes to be carried out by a user in a manner requiring great resources. In this case the user must determine, by comparing the two microscope images in each examination, the zoom adjustment of the second zoom microscope in dependence upon the zoom adjustment of the first zoom microscope carried out in such a way that the actual magnifications of the two zoom microscopes coincide or have another desired magnification ratio.

A disadvantage with these conventional microscope devices is accordingly that very great resources are required to carry out appropriate zoom adjustments.

SUMMARY

The present invention provides a microscope device and a method for operating a microscope device, wherein zoom adjustments of the two zoom microscopes can be carried out in a simple way.

Advantageous variants of the method according to the invention and embodiments of the microscope device according to the invention are the subject matter of the dependent claims and are also described in the following description, in particular in association with the drawings.

In the method of the abovementioned type it is provided according to the invention that, in order to set a certain magnification ratio between the zoom microscopes, the zoom adjustment of the second zoom microscope is automatically carried out on the basis of a coupling function, or, for a size comparison between specimens brought into beam paths of the two zoom microscopes, a magnification ratio between a zoom adjustment of the first microscope and the zoom adjustment of the second zoom microscope in dependence upon these zoom adjustments and on the basis of a coupling function is determined, wherein an assignment of zoom adjustments of the first zoom microscope to zoom adjustments of the second zoom microscope is produced through the coupling function.

It is provided in the microscope device of the abovementioned type according to the invention that electronic control means are present and are adapted, for setting a certain magnification ratio between the zoom microscopes, to automatically carry out a zoom adjustment of the second zoom microscope in dependence upon a zoom adjustment of the first zoom microscope and on the basis of a coupling function or, for a size comparison between specimens brought into beam paths of the two zoom microscopes, to determine a magnification ratio between zoom adjustments carried out in relation to the two zoom microscopes in dependence upon these zoom adjustments and on the basis of a coupling function, whereby through the coupling function an assignment of zoom adjustments of the first zoom microscope to zoom adjustments of the second zoom microscope is produced.

The invention can be seen as providing an assignment of zoom adjustments of the two zoom microscopes relative to each other via the coupling function. In contrast with conventional microscope devices, a user no longer has to carry out or calculate such an assignment himself.

A substantial improvement in operating comfort is given with an operating mode, in which the zoom adjustment of the second zoom microscope is automatically carried out. In this case, a user must therefore only select or set a single magnification, namely the zoom adjustment of the first zoom microscope or a global magnification for both zoom microscopes. On the other hand a user must set a desired magnification respectively for each zoom microscope in the case of known microscope devices. Utilization is particularly simplified by the invention if an automatic synchronous zoom adjustment takes place, that is to say, as soon as the user changes a selection of only one zoom adjustment, the zoom adjustments of the two zoom microscopes are changed in a motorized manner according to the selection.

However, significant ease of use is also provided for a user through the assignment of zoom adjustments produced through the coupling function if a size comparison with the zoom microscopes is carried out. A user can hereby freely carry out the zoom adjustments of the two zoom microscopes, thus without the zoom adjustment of the second zoom microscope being carried out automatically in dependence upon the zoom adjustment of the first zoom microscope. In the case of conventional microscope devices a user must calculate, from the zoom adjustments carried out, a magnification ratio himself which constitutes a size ratio between the objects to be compared. According to the invention on the other hand the associated magnification is determined automatically for the two zoom adjustments carried out and the ratio is formed from this. This value can be output on a screen or into a computer readable file, whereby the resources to be applied by a user are significantly reduced.

According to an embodiment of the method according to the invention the coupling function respectively assigns zoom adjustments with the same nominal magnifications to each other. In this case, therefore, a pair comprising a zoom adjustment of the first zoom microscope and a zoom adjustment of the second zoom microscope, assigned through the coupling function, have coinciding nominal magnifications. If the user selects the magnification of the second zoom microscope to be equal to the magnification of the first zoom microscope, the zoom adjustment of the second zoom microscope is automatically carried out which is assigned via the coupling function to the momentary zoom adjustment of the first zoom microscope.

The user can also select a certain magnification ratio between the two zoom microscopes. The zoom adjustment of the second zoom microscope, at which the nominal magnification of the zoom adjustment of the first zoom microscope, assigned via the coupling function, is in the desired magnification ratio to the nominal magnification of the momentary zoom adjustment of the first zoom microscope, is then automatically carried out. A nominal magnification can be understood to be a magnification which is identically predefined for all zoom microscopes of a certain product type. Manufacturing tolerances between the zoom microscopes of the same product type are accordingly not considered in the nominal magnification.

In order to correct manufacturing tolerances, in principle the two zoom microscopes can be mechanically reworked in an individual manner. In this connection the zoom barrels which contain the optical components for providing the zoom are removed and mechanically worked so that the actual magnification changes with a certain zoom adjustment. A magnification difference between the two zoom microscopes can hereby be reduced by carrying out equal zoom adjustments. However, this process requires comparatively great resources. In addition it is necessary in principle for the zoom barrels to be mechanically reworked as appropriate for each possible zoom adjustment. In order to keep the reworking resources lower it can be provided to carry out such a correction only for some zoom adjustments, in which the zoom microscope is brought into a defined engagement position, which is also called zoom click stop. In the case of other zoom adjustments which do not coincide with the click stops the magnification difference between the two zoom microscopes is only negligibly improved with this conventional mode of correction. A desired tolerance can thus be guaranteed in the magnification difference of maximum 2% at least for certain click stops, for example for eight to ten zoom adjustments. In the case of other zoom adjustments on the other hand a higher magnification difference can be provided.

In the case of a configuration of the invention, manufacturing tolerances can be compensated without mechanical reworking of the zoom barrels being necessary. In this case the coupling function does not compulsorily assign zoom adjustments of the same nominal magnification to each other. Instead the coupling function is formed at least by means of an actual magnification, determined in a calibration measurement, in the case of a zoom adjustment of the first zoom microscope and/or by means of an actual magnification, determined in a calibration measurement, in the case of a zoom adjustment of the second zoom microscope.

Thus, it is possible for example to determine an actual magnification with a calibration measurement in case of a zoom adjustment of the first zoom microscope. Then a zoom adjustment of the second zoom microscope is determined, at which the actual magnification coincides with an actual magnification produced in the case of the first zoom microscope. These zoom adjustments of the two zoom microscopes are assigned to each other through the coupling function.

In principle it suffices if at least a pair of zoom adjustments of the two zoom microscopes are determined, at which the actual magnifications coincide, through calibration measurements, whereby knowledge of this actual magnification is not required. A decisive factor is that the difference between the actual magnifications with the zoom adjustments assigned to each other is as low as possible. Thus, in the calibration measurements, for example, two identical objects or objects of the same type can be brought into the specimen planes of the two zoom microscopes and subsequently two zoom adjustments determined, in which the two images of the objects produce a connected image, thus having the same actual magnification. No numerical value must thereby be determined in this case for this actual magnification.

The coupling function is determined in these embodiments on the basis of magnifications which have been determined in a calibration measurement, thus experimentally and individually for the respective zoom microscope. Actual magnifications are thus determined which can differ between the same zoom adjustments in case of two zoom microscopes of the same product type. The coupling function is not therefore based or not solely based upon nominal magnifications which are identical for the same zoom adjustments of different zoom microscopes of the same product type. Instead, for each zoom microscope, at least for a zoom adjustment, an actual magnification which can deviate from the nominal magnification is determined in a calibration measurement.

In the case of a first basic execution of the method according to the invention and the device according to the invention the coupling function is used to control the second zoom microscope. The zoom adjustment of the first zoom microscope is thereby predefined through a user, for example by inputting a desired magnification value via an input means such as for example a computer. This can also be understood as a manual input. In dependence upon this zoom adjustment of the first zoom microscope and via the coupling function, the zoom adjustment of the second zoom microscope is carried out automatically, that is to say without a user having to manually carry out or select the magnification of the second zoom microscope.

In the case of a second basic configuration of the method according to the invention the coupling function is used for a size comparison of specimens. The zoom adjustments of the two zoom microscopes are carried out manually in this case. A user thus selects the zoom adjustments of the two zoom microscopes himself. This can be desirable in forensics for example in order to quantify the shrinkage of a projectile. A reference projectile is hereby brought into the beam path of one of the zoom microscopes and the projectile used, which is to be examined, is brought into the other beam path of the two zoom microscopes. The projectile used, that is to say fired, can be compressed or shrunk upon collision with a target body. In this case a user selects zoom adjustments, with which the two microscope images produce a connected image. This means that the images produced by the reference projectile and the projectile to be examined have a coinciding size. A knowledge of the change in size or the shrinkage factor of the projectile to be examined is thus desired. This shrinkage factor corresponds precisely to the ratio of the actual magnifications of the two zoom adjustments carried out manually in the described way. Whereas, in the case of conventional microscope devices, merely the nominal magnifications for these two zoom adjustments are known, a more precise indication concerning the actual magnifications can take place according to the invention on the basis of the coupling function. A more precise determination of the magnification ratio between the two zoom adjustments and hence the shrinkage factor of the specimen is therefore also possible. In an embodiment, the current magnification ratio is automatically output, while a user carries out the zoom adjustments manually.

In the case of embodiments of the microscope device according to the invention and variants of the method according to the invention, both the first and the second basic configurations described above are provided. In this case a user selects whether the automatic execution of the zoom adjustment of the second zoom microscope for setting a certain magnification ratio is to take place or whether the output of the magnification ratio takes place between the manually executed zoom adjustments for the size comparison.

In principle the microscope device can also comprise more than two zoom microscopes. In this case the above indications and those which follow concerning the second zoom microscope also apply for all further zoom microscopes. In particular, even for the further zoom microscopes, for at least one zoom adjustment an actual magnification is determined in a calibration measurement and a coupling function is thereby formed.

In the case of an automatic adjustment of a certain magnification ratio between the two zoom microscopes, in particular over the whole zoom range thereof, the deviations from the desired magnification ratios must be as low as possible. Therefore, calibration measurements for several zoom adjustments may be carried out with each zoom microscope. According to an advantageous method variant it is thus provided that the coupling function is formed by means of actual magnifications, determined in calibration measurements, in a plurality of zoom adjustments of the first zoom microscope and by means of actual magnifications, determined in calibration measurements, in a plurality of zoom adjustments of the second zoom microscope.

In principle, actual magnifications can be determined in the calibration measurements in the case of one or more random zoom adjustments of the first zoom microscope and in the case of one or more random zoom adjustments of the second zoom microscope.

These zoom adjustments of the two zoom microscopes can be selected independently of each other. In case of a method variant, such zoom adjustments of the two zoom microscopes are selected, in which the actual magnifications coincide. At least in case of a pair comprising a zoom adjustment of the first zoom microscope and a zoom adjustment, assigned through the coupling function, of the second zoom microscope, the actual magnifications determined in a calibration measurement then coincide.

Alternatively or additionally it can be provided that a deviation from the actually determined magnification is determined respectively with calibration measurements for nominal magnifications of the two zoom microscopes. The coupling function then assigns, on the basis of these corrected magnifications, zoom adjustments to each other. It is provided in the case of this embodiment of the method according to the invention that, for at least one zoom adjustment of the first zoom microscope, a deviation between a nominal magnification of this zoom adjustment and an actual magnification of this zoom adjustment is determined, that, for at least one zoom adjustment of the second zoom microscope, a deviation between a nominal magnification of this zoom adjustment and an actual magnification of this zoom adjustment is determined, that, in case of zoom adjustments which are assigned to each other through the coupling function, the nominal magnification of a zoom adjustment of the first zoom microscope, corrected by the at least one determined deviation for the first zoom microscope, coincides with the nominal magnification of the assigned zoom adjustment of the second zoom microscope, corrected by the at least one determined deviation for the second zoom microscope. If a deviation is determined for each zoom microscope only for a respective zoom adjustment, it is assumed as an approximation for the assignment by the coupling function that in the case of all zoom adjustments of a zoom microscope the respective deviation between the nominal magnification and the actual magnification is of equal magnitude. For greater precision, deviations can be determined, in the case of the zoom microscopes respectively for different zoom adjustments, which are used in the coupling function.

In the case of the above-described assignment through the coupling function, a correction of the nominal magnifications takes place for the two zoom microscopes. Alternatively it can also be provided to determine a difference between the nominal magnifications of the two zoom microscopes upon carrying out equal zoom adjustments. This difference then forms the basis for the coupling function. It is hereby provided that a respective nominal magnification is assigned to the zoom adjustments of the two zoom microscopes, that a respective actual magnification is determined in a calibration measurement for at least one zoom adjustment of the first zoom microscope and for a zoom adjustment of the second zoom microscope, to which the same nominal magnification is assigned, that at least one correction factor is formed as a ratio from these actual magnifications, that, in case of zoom adjustments assigned to each other through the coupling function, a nominal magnification of a zoom adjustment of the first zoom microscope and a nominal magnification, modified by the at least one correction factor, of an assigned zoom adjustment of the second zoom microscope coincide.

If stepper motors are used to carry out various zoom adjustments, equal zoom adjustments and/or equal nominal magnifications can be understood to mean that in the case of both zoom microscopes the same numbers of steps are set with the stepper motors.

In the case of practical realizations one or more zoom adjustments of each zoom microscope can be calibrated, while other zoom adjustments are not calibrated, that is to say no calibration measurements are carried out for these in order to determine the actual magnification. In order to ensure that an assignment with a magnification difference which is as small as possible takes place through the coupling function even for non-calibrated zoom adjustments, according to a method variant an assignment of non-calibrated zoom adjustments is realized, through the coupling function, on the basis of a correction ratio of that calibrated zoom adjustment, the nominal magnification of which has the smallest deviation from the nominal magnification of the non-calibrated zoom adjustment, wherein the correction ratio is given through the actual magnification of a zoom adjustment, determined in a calibration measurement, and through a nominal magnification of said zoom adjustment. For example by way of an approximation to an actual magnification of a non-calibrated zoom adjustment, it is possible to use a nominal magnification of this zoom adjustment modified by the correction ratio. If the nominal magnification for a non-calibrated zoom adjustment lies between the nominal magnifications of two calibrated zoom adjustments, an actual magnification for the non-calibrated zoom adjustment can be approximated through formation of an average value from the two correction ratios of the calibrated zoom adjustments. Such an interpolation can be carried out for example by means of a spline or polynomial function.

In the case of a calibration measurement, it is initially possible to determine an actual magnification for a randomly selected zoom adjustment of the first zoom microscope. A zoom adjustment of the second zoom microscope is then determined which leads to the same actual magnification. In the case of an embodiment of the method according to the invention a calibration measurement comprises at least the following steps:

a) incorporating a first object as a measure into a specimen plane of the first zoom microscope and incorporating a second object as a measure into an intermediate image plane of the first zoom microscope, b) determining an actual magnification for a first zoom adjustment of the first zoom microscope through a size comparison between a first image which the first object produces in an image plane of the first zoom microscope and a second image which the second object produces in the image plane, c) incorporating a third object as a reference measure into a specimen plane of the second zoom microscope and incorporating a fourth object as a reference measure into an intermediate image plane of the second zoom microscope and d) carrying out a first zoom adjustment of the second zoom microscope, in which the actual magnification of the second zoom microscope is equal to the actual magnification of the first zoom microscope, wherein the determination of a current actual magnification of the second zoom microscope takes place through a size comparison between a third image, which the third object produces in an image plane of the second zoom microscope, and a fourth image, which the fourth object produces in the image plane.

Through the coupling function, an assignment of the zoom adjustment of the second zoom microscope, determined in step d), to the zoom adjustment of the first zoom microscope, carried out in step b), can be fixed. In order to calibrate several zoom adjustments, the steps b) and d) can also be carried out for further zoom adjustments.

In case of a modification of the calibration method described above, step d) is modified in that a zoom magnification is carried out on the second zoom microscope coinciding with the zoom adjustment of the first zoom microscope. This means that the nominal magnifications coincide for these zoom adjustments. When using stepper motors the same numbers of steps and thus nominally equal lens positions are set with them. Through such a modified calibration measurement, a magnification ratio between the same zoom adjustments of the two zoom microscopes is determined. In order to ensure that zoom adjustments assigned to each other have as far as possible equal actual magnifications, the determined magnification ratio is considered in the assignment which is produced through the coupling function.

In the case of these calibration methods the first and the third object can be identical or formed by one and the same object. Likewise, the second and the fourth object can be identical or formed through one and the same object. The measures and reference measures used can thus be the same or also different. The first and the third object can also be described as object micrometers. The second and fourth object can also be described as ocular micrometers and may be arranged in an intermediate image plane in or on the ocular. The calibration measurement thereby detects the overall magnification from the specimen location as far as the intermediate image plane in the ocular. The zoom microscopes can respectively comprise an objective, a zoom body and a tube lens. In the case of a calibration measurement the actual magnification is then determined which is composed of the magnification of the objective, the magnification of the tube lens and the magnification of the zoom body which depends upon the selected zoom adjustment. A tolerance in the magnification of the objective and the tube lens is thus also detected. As the deviations between actual magnification and nominal magnification can differ in size for different zoom adjustments of a zoom microscope, a plurality of calibration measurements for different zoom adjustments may be carried out.

The aforementioned image planes of the two zoom microscopes can be produced with or in an ocular or alternatively with or in a camera adapter. The zoom microscopes can also be described as digital microscopes in the latter configuration.

In the case of digital microscopes a calibration measurement can take place to determine the magnification for a zoom adjustment of a zoom microscope already with a single object as a measure. This is brought into the specimen plane of the respective zoom microscope. The image plane, in which a magnified image of this object is produced, then lies on the image sensor of the camera. It is thus no longer necessary to bring a further object as a measure into a respective intermediate image plane. Indeed, an image size of the object brought into the respective specimen plane can easily be determined in the digital image recorded by the camera by digital image processing means. The coupling function is also formed with such a purely electrical version with the actual magnifications which have been determined in the respective calibration measurement(s).

In this configuration with digital microscopes, it is thus already sufficient if a calibration measurement comprises at least the following steps: a) incorporating a first object as a measure into a specimen plane of the first zoom microscope, b) determining an actual magnification for a zoom adjustment of the first zoom microscope through a size determination of an image which the first object produces in an image plane of the first zoom microscope, c) incorporating a further object as a reference measure into a specimen plane of the second zoom microscope and d) determining an actual magnification for a zoom adjustment of the second zoom microscope through a size determination of an image which the further object produces in an image plane of the second zoom microscope.

It is indeed in principle also possible for a zoom adjustment to be realized by displacing lens groups along a milled frame. The milled frame is thereby formed as a non-linear mechanical control curve, along which the lens groups are displaced by motorized means. By means of the coupling function an offset in the motorized positioning of the lens groups between the two zoom microscopes can then be defined. Due to the non-linearity of the mechanical control curve, however, a correction of the magnification difference between the two zoom microscopes requires a motorized control which necessitates great resources. In case of simple configurations therefore a low tolerance is thus achieved in the magnification difference between the zoom microscopes, for example a tolerance of maximum 3% or maximum 1%, only in a part of the available zoom range.

In case of embodiments of the method according to the invention and the device according to the invention, it is not therefore a mechanical control curve produced through milling that is used. Instead a virtual control curve is used which is produced through a step table for stepper motors. The stepper motors can be activated according to numbers of steps from the step table, and lens groups are thereby displaced to set a desired zoom magnification.

According to an embodiment of the device according to the invention it is thus provided that at least one first stepper motor to move lenses of the first zoom microscope and at least one second stepper motor to move lenses of the second zoom microscope are present, that the electronic control means are adapted to carry out zoom adjustments according to step tables with the stepper motors and that, through the coupling function, the assignment of zoom adjustments as an assignment of numbers of steps of the first stepper motor to numbers of steps of the second stepper motor is given.

Each zoom microscope can thereby comprise a plurality of stepper motors, for example three stepper motors, with which a plurality of lenses or lens groups can be adjusted independently of each other. Each zoom adjustment is thus determined by a number of steps for each stepper motor.

Having regard to a non-linear mechanical milling which fixes the lens positions for different zoom adjustments, a more precise correction can thus easily be achieved through step tables for stepper motors. It is hereby particularly advantageous that an assignment of non-calibrated zoom adjustments is not influenced by the non-linearity of a mechanical control curve.

A nominal magnification of a zoom microscope is determined at least by the nominal magnifications of the objective, the zoom body with the zoom adjustment carried out and the tube lens. In the same way, an actual magnification of a zoom microscope is determined at least by the actual magnifications of the objective, the zoom body in the zoom adjustment carried out and the tube lens.

In the aforementioned zoom bodies with stepper motors it is possible, particularly in the manufacturing process, to determine numbers of steps for actual magnifications of the zoom body. These magnifications can then be assigned to the numbers of steps as nominal magnifications of the zoom body. For certain zoom adjustments the nominal magnifications of the zoom body are then equal to the actual magnifications of the zoom body. Here, different zoom bodies thus have different numbers of steps for the same nominal magnifications of the zoom body.

As the nominal magnification of the whole zoom microscope is also determined by the objective and the tube lens, however, deviations can also be present in this case between the nominal magnification of the zoom microscope in case of a zoom adjustment carried out and the actual magnification.

It can be provided that the coupling function assigns zoom adjustments of the two zoom microscopes to each other, in which the nominal magnifications of the zoom bodies are the same. If, for each zoom body, numbers of steps have previously been assigned to certain nominal magnifications, according to this configuration the numbers of steps of zoom adjustments which are assigned to each other via the coupling function can be different.

According to a method variant, a user can set a synchronous mode, in which a magnification ratio predefined by the user is kept constant between the two zoom microscopes. It is hereby provided that in order to maintain a certain magnification ratio between the zoom microscopes in case of a manual change in the zoom adjustment of one of the two zoom microscopes, an automatic change of the zoom adjustment of the other of the two zoom microscopes takes place on the basis of the coupling function in such a way that a ratio of the actual magnifications between the two zoom microscopes remains constant within 3%, preferably within 1%. The magnifications of the zoom adjustments, assigned by the virtual control curve, hereby coincide with the actual magnifications within a deviation of less than 0.5%. If a user selects a certain first zoom adjustment of the first zoom microscope, that zoom adjustment of the second zoom microscope is automatically selected, the zoom adjustment of which, assigned via the coupling function, of the first zoom microscope forms the predefined magnification ratio in relation to the first zoom adjustment of the first zoom microscope. The determination of the magnification ratio can also take place here by offsetting the nominal magnifications of the zoom adjustments of the first zoom microscope.

The certain magnification ratio can be predefined by manually carrying out both a zoom adjustment of the first zoom microscope and also a zoom adjustment of the second zoom microscope.

In the case of an embodiment of the microscope device according to the invention, additionally or alternatively, input means, for example a control unit with touch screen, are present, with which a user can input a certain magnification ratio. The electronic control means provides a user with a selection of different operating modes, in which a certain magnification ratio is retained. The determined magnification ratio is thereby predefined in an operating mode by input through the input means and in another operating mode the magnification ratio is predefined by manually carrying out a zoom adjustment of the first zoom microscope and a zoom adjustment of the second zoom microscope.

According to embodiments of the microscope device according to the invention said microscope device is adapted, in particular through the electronic control means, to carry out the method according to the invention and the method variants.

BRIEF DESCRIPTION OF THE DRAWINGS

Further advantages and features of the invention are described below by reference to the attached schematic drawings.

FIG. 2 shows a schematic illustration of zoom adjustments with associated magnifications and an assignment of the zoom adjustments of the second zoom microscope to zoom adjustments of the first zoom microscope.

The same components and those having the same effect are generally identified in both figures with the same reference numerals.

DETAILED DESCRIPTION

Figure 1:
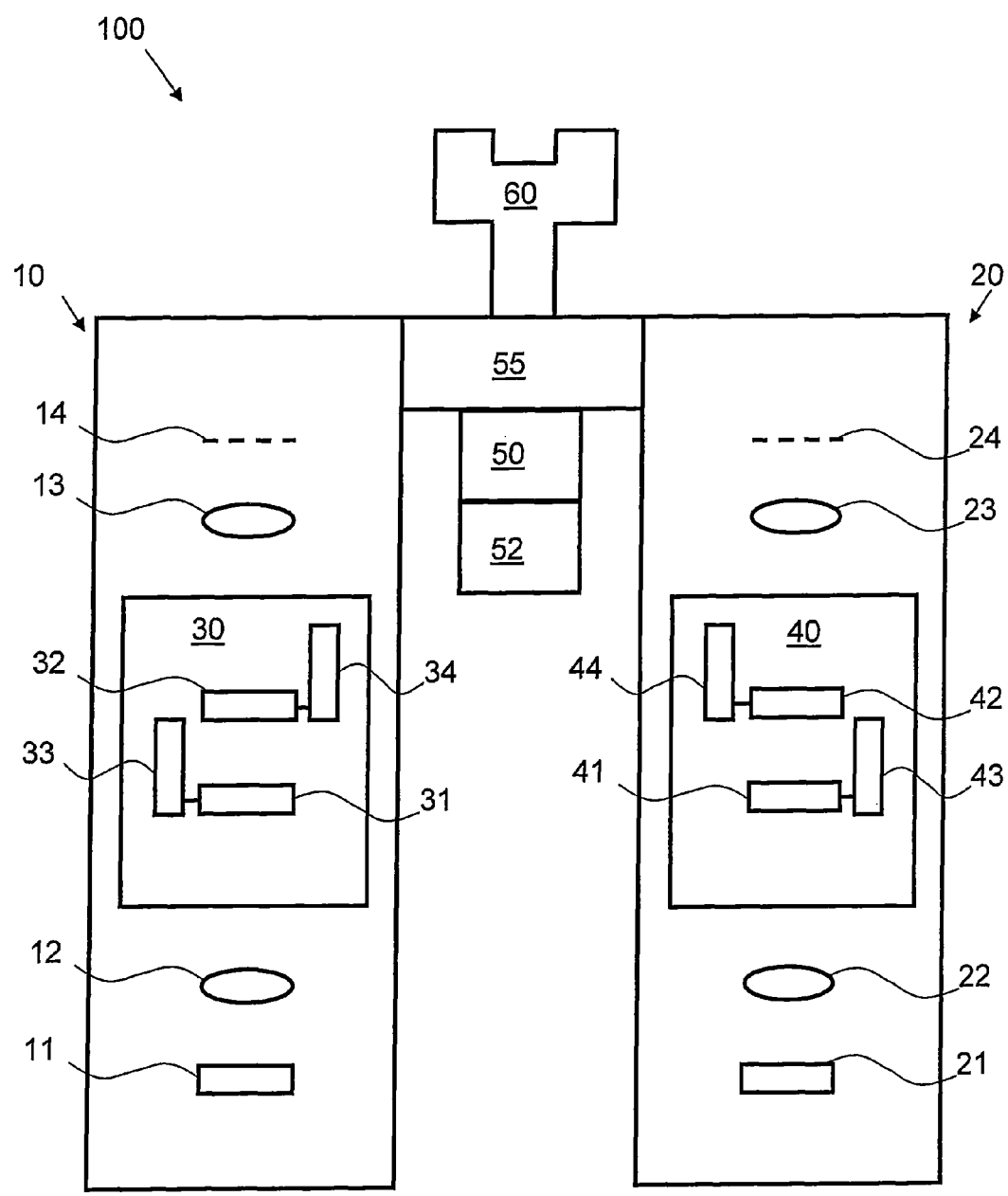
FIG. 1 shows a schematic illustration of a microscope device according to the invention with two zoom microscopes.

FIG. 1 shows schematically an embodiment of a microscope device 100 according to the invention. This comprises, as components, a first zoom microscope 10 and a second zoom microscope 20. The beam paths thereof are brought together in an optical bridge 55 and guided together into an ocular 60 and/or to a camera.

The first zoom microscope 10 comprises a specimen plane 11, on which a specimen to be examined can be positioned.

In order to produce a magnified image of the specimen the first zoom microscope comprises an objective 12, a zoom body 30 and a tube lens 13.

The second zoom microscope 20 also comprises an objective 22, a zoom body 40 and a tube lens 23 in order to produce a magnified image of a further specimen which is positioned on the specimen plane 21 of the second zoom microscope 20.

The first and the second zoom microscope 10, 20 can be identically formed.

In order to adjust different zoom magnifications, the zoom body 30 of the first zoom microscope 10 comprises a plurality of lenses or lens groups 31, 32 which can be displaced relative to each other. In this connection the lens groups 31, 32 are connected to stepper motors 33, 34 which can be controlled independently of each other. In principle it is already sufficient if a single lens group can be adjusted relative to the remaining lens groups with a stepper motor. In case of a parfocal zoom, at least two lens groups must be moved. Therefore, a plurality of, in particular at least two, stepper motors are present in order to be able to position at least two lens groups independently of each other.

The zoom body 40 of the second zoom microscope 20 can be constructed in the same way as the zoom body 30 of the first zoom microscope 10 and likewise comprises a plurality of lens groups 41, 42, which can be moved relative to each other by means of stepper motors 43, 44 to set a desired zoom magnification.

It is possible with the microscope device 100 according to the invention to compare two specimens which are positioned in the specimen planes 11, 21 of the two zoom microscopes 10, 20. A main field of application is forensics. The two specimens can thereby be projectiles whereby it is to be ascertained whether the projectiles were shot by the same weapon. Insofar as the microscope images of the two zoom microscopes 10, 20 are jointly reflected into the ocular 60, sections of both microscope images can be simultaneously observed. By means of a comparison slide it is possible to select which sections of the two microscope images are reflected into the ocular 60. In the case of a digital microscope, in which the ocular 60 is replaced by a camera adapter, the comparison slide can be formed by an image mixer, thus by digital image processing means. In order to compare the microscope images, a user must set a certain magnification ratio between the magnifications of the two zoom microscopes 10, 20. The magnification ratio can have a value of 1 or, for example if the specimens are of different sizes, a value other than 1.

In addition a user is to be able to adjust the zoom magnifications of the two zoom microscopes 10, 20 without the magnification ratio thereby changing between the zoom microscopes 10, 20.

Electronic control means 50 are thus present which control the stepper motors 33, 34, 43, 44 to carry out different zoom adjustments. Step tables for the stepper motors 33, 34, 43, 44 are stored in the electronic control means 50, wherein the step tables contain different numbers of steps which respectively correspond to a zoom adjustment. For example it can be provided that each stepper motor 33, 34, 43, 44 can adjust the associated lens groups 31, 32, 41, 42 along a respective spindle through 7000 different numbers of steps.

A user can select a zoom adjustment via input means 52 or select a desired zoom adjustment directly on one of the two zoom microscopes 10, 20. In dependence upon this zoom adjustment the electronic control means 50 carries out a zoom adjustment of the first zoom microscope 10 and a zoom adjustment of the second zoom microscope 20.

It is provided in one embodiment that the same numbers of steps with corresponding stepper motors 33, 43 and 34, 44 of the two zoom microscopes 10, 20 are set for the same zoom adjustments and the same nominal magnifications. Due to manufacturing tolerances, in particular of the objectives 12, 22 and the tube lenses 13, 23, however, the actual magnifications of the two zoom microscopes 10, 20 generally do not coincide.

Improvements can be achieved in embodiments, in which zoom adjustments for certain actual magnifications are previously determined with the zoom bodies 30, 40 of the two zoom microscopes 10, 20. These actual magnifications are assigned to the numbers of steps of these zoom adjustments as nominal magnifications. Therefore, different zoom bodies 30, 40 of the same product type can also have different numbers of steps for a zoom adjustment with the same nominal magnification. Deviations between an actual magnification of a zoom microscope and the nominal magnification are then based for a large part on manufacturing tolerances of the objective and the tube lens and can be less than 1%.

The coupling function can now assign such zoom adjustments of the two zoom microscopes 10, 20 to each other, of which the nominal magnifications are equal. The numbers of steps of the zoom adjustments assigned to each other can thereby be different, as described above.

Alternatively, however, it can also be provided to consider deviations between nominal magnifications and actual magnifications of the two zoom microscopes 10, 20 through the coupling function.

The electronic control means 50 does not then assign zoom adjustments of the two zoom microscopes 10, 20 to each other, of which the nominal magnifications coincide. Instead, according to the invention, an assignment of zoom adjustments of the first zoom microscope 10 to zoom adjustments of the second zoom microscope 20 is produced through a coupling function, where corrected nominal magnifications coincide for zoom adjustments assigned to each other.

In order to correct the nominal magnifications of the two zoom microscopes 10, 20, a calibration measurement is carried out at least for one zoom adjustment for each zoom microscope 10, 20. The deviations determined in the calibration measurement between nominal magnifications and actual magnifications of zoom adjustments are used for the assignment through the coupling function.

For a calibration measurement of a zoom adjustment of the first zoom microscope 10 it is possible for example for a first object, as a measure, to be brought into the specimen plane 11 and a second object, as a measure, into an intermediate image plane 14 of the first zoom microscope 10. The intermediate image plane 14 is conjugated with the specimen plane 11 so that a magnified image of the first object is produced on the intermediate image plane 14, of which the magnification depends upon the magnification of the objective 12, the magnification of the tube lens 13 and the magnification of the zoom adjustment of the zoom body 30 carried out. A size comparison between images of the first and second object which are produced with the ocular 60 are carried out. Additionally or alternatively to the ocular 60, a camera adapter can also be used, with which an evaluation is possible using digital microscope images. With such a calibration measurement the actual magnification in the zoom adjustment carried out is determined and stored to form the coupling function. The actual magnifications of the objective 12 and the tube lens 13 are also hereby considered.

In a similar way, at least one calibration measurement is carried out for at least one zoom adjustment of the second zoom microscope 20. In the same way a third object is hereby brought in the specimen plane 21 and a fourth object into an intermediate image plane 24, and an actual magnification is determined in the zoom adjustment carried out from the specimen plane 21 up to the intermediate image plane 24. Said first, second, third and fourth objects, which are used as a measure or reference measure, can thereby be identical to each other or differ from each other.

If only one calibration measurement is carried out for each zoom microscope 10, 20, precisely one deviation between a nominal magnification and an actual magnification of a zoom adjustment is determined for each zoom microscope 10, 20. This deviation is then also used to correct all the remaining zoom adjustments of the same zoom microscope. The coupling function then assigns zoom adjustments to each other, the corrected nominal magnifications of which coincide. For each zoom microscope 10, 20 a plurality of calibration measurements can also be carried out for different zoom adjustments, whereby a plurality of deviations between nominal magnifications and actual magnifications for different zoom adjustments of the same zoom microscope are determined. In order to correct the nominal magnifications, all the determined deviations are then used.

The step tables can contain for each line a number of steps for assuming a zoom adjustment. A determined deviation can then be considered through the coupling function as a line difference in the step table.

With reference to FIG. 2 an assignment, produced through the coupling function, of zoom adjustments of the two zoom microscopes is explained.

FIG. 2 shows schematically different zoom adjustments A1 to A7 of the first zoom microscope and different zoom adjustments B1 to B7 of the second zoom microscope. Each of these zoom adjustments is defined respectively by a set of numbers of steps for the existing stepper motors. The two zoom microscopes may belong to the same product type. The numbers of steps can then coincide respectively within a pair of zoom adjustments A1, B1 and A2, B2 to A7, B7. Different numbers of steps can, however, also be associated with zoom adjustments of the same nominal magnification for zoom microscopes of the same product type.

A nominal magnification NV is assigned to each zoom adjustment A of the first zoom microscope. Correspondingly, a nominal magnification NV is assigned to each zoom adjustment B of the second zoom microscope.

If the two zoom microscopes belong to the same product type, the nominal magnification NV1 belonging to the zoom adjustment A1 and the nominal magnification NV1 belonging to the zoom adjustment B1 can have the same value. Due to manufacturing tolerances, however, the associated actual magnifications RV generally do not coincide. FIG. 2 shows actual magnifications RV schematically with RV1 to RV9. Although the zoom adjustments A1 and B1 have the same nominal magnification NV1 in the example shown, the zoom adjustment B1 has an actual magnification of RV1, while the zoom adjustment A1 has an actual magnification RV3 differing from RV1.

Through the coupling function K, zoom adjustments A of the first zoom microscope are assigned to zoom adjustments B of the second zoom microscope, wherein the numbers of steps of the assigned zoom adjustments are different or can be different.

This assignment is shown in the example illustrated for a pair of zoom adjustments A1 and B3. While the associated nominal magnifications NV1 and NV3 are different, the associated actual magnifications RV1 and RV3 are equal within a tolerance of 3%, preferably 1%. An assignment of the remaining zoom adjustments also takes place through the coupling function K.

The calibration measurement is only carried out as a rule for one or more zoom adjustments but not for all zoom adjustments of the zoom microscopes. For example the actual magnifications RV1, RV3 can have been determined in calibration measurements for the zoom adjustments A1, B3. This pair of zoom adjustments A1, B3 with coinciding actual magnifications are assigned to each other via the coupling function K. For other zoom adjustments A2, B4 on the other hand no calibration measurement is carried out and accordingly an actual magnification is not exactly known. In order to nonetheless be able to assign non-calibrated zoom adjustments A2, B4 to each other, the deviations which were respectively determined with the zoom adjustments A1, B3 between the associated nominal magnifications NV1, NV3 and the actual magnifications RV1, RV3 are used.

According to a simple embodiment the coupling function K is based upon a line difference or a line change factor between a step table for the zoom adjustments A and a step table for the zoom adjustments B. If a first zoom adjustment A is assumed according to a certain line of the step table, a zoom adjustment B is carried out corresponding to the line of an equal step table modified by the line difference or the line change factor.

The line difference or the line modification factor can thereby be determined with the calibration measurements for the zoom adjustments A1, B3 and subsequently also used for all remaining, non-calibrated zoom adjustments A2-A7, B1, B2, B4-B7.

According to another simple coupling method, zoom adjustments with the same nominal magnifications of the zoom bodies 30, 40 are assigned to each other. This may be used with zoom bodies with an individual step table, the numbers of steps of which differ for an equal nominal magnification.

It can be provided here that both zoom microscopes 10, 20 are adjusted by means of calibration scales one after the other to the same actual magnification RV1.

This actual magnification RV1 can correspond in the case of the first zoom microscope 10 to a nominal magnification NV1 and in the case of the second zoom microscope 20 to a nominal magnification NV2. This can be different from the nominal magnification NV1 of the first zoom microscope 10 due to manufacturing tolerances.

The zoom adjustments for NV1 on the first zoom microscope 10 and for NV2 on the second zoom microscope 20 are now assigned to each other through the coupling function. This assignment can be expressed as $NV2=k*NV1$, wherein k is a coupling constant. The numbers of steps for the nominal magnifications are thereby known and stored on the respective zoom microscope.

If the actual magnification is changed to RV3 and thus the nominal magnification to NV3 in the operation on the first zoom microscope 10, the second zoom microscope 20 can be brought to the nominal magnification $NV4=k*NV3$ determined through the coupling function. Also in the case of the second zoom microscope 20, the actual magnification RV3 is hereby adjusted. Constant magnification defects of the objectives, tube lenses and zoom bodies which are unavoidable due to manufacturing tolerances can thus be extensively compensated.

A user can also predefine a magnification ratio between the two zoom microscopes which is different from 1. Then, for a first zoom adjustment A of the first zoom microscope, that zoom adjustment B of the second zoom microscope is carried out, in relation to which the zoom adjustment A, assigned via the coupling function K, for the aforementioned first zoom adjustment has the desired magnification ratio.

According to the method according to the invention and the microscope device according to the invention it can be provided that a user can select between different operating modes. In a synchronous mode a magnification ratio selected or set by the user is kept constant between the two zoom microscopes. In this connection if a user changes the zoom adjustment on one of the two zoom microscopes, according to the coupling function, a change of the zoom adjustment of the other zoom microscope automatically takes place.

On the other hand a user can adjust the two zoom microscopes in a size comparison mode independently of each other. For example he can carry out zoom adjustments, in which the images produced by different sized specimens are of equal size. The electronic control means outputs, as the size difference between the specimens, the magnification ratio for the zoom adjustments carried out, for which the coupling function is used.

This means that, in order to determine the magnification ratio, the actual or corrected magnification assigned to the zoom adjustment A of the first zoom microscope carried out is used. In addition the actual or corrected magnification of the zoom adjustment of the first zoom microscope is used which is assigned via the coupling function K to the zoom adjustment B of the second zoom microscope.

If there is now a switch from the size comparison mode to the synchronous mode, the determined size difference can be used as a constant magnification ratio in the synchronous mode. The two specimens can thus be conveniently compared with each other over the whole zoom range of the two zoom microscopes.

Utilization is advantageously clearly simplified for a user through the method according to the invention and the microscope device according to the invention insofar as the relationship between actual magnifications of the zoom adjustments of the two zoom microscopes is particularly precisely known. In case of zoom adjustments being carried out automatically, a subsequent correction by the user is not necessary or is only seldom necessary.

REFERENCE SYMBOLS

100 Microscope device
10 First zoom microscope
11 Specimen plane of the first zoom microscope
12 Objective of the first zoom microscope
13 Tube lens of the first zoom microscope
14 Intermediate image plane of the first zoom microscope
20 Second zoom microscope
21 Specimen plane of the second zoom microscope
22 Objective of the second zoom microscope
23 Tube lens of the second zoom microscope
24 Intermediate image plane of the second zoom microscope
30 Zoom body of the first zoom microscope
31, 32 Lens groups of the zoom body 30
33, 34 Stepper motors for the lens groups 31, 32
40 Zoom body of the second zoom microscope
41, 42 Lens groups of the zoom body 40
43, 44 Stepper motors for the lens groups 41, 42
50 Electronic control means
52 Input means
55 Optical bridge
60 Ocular
A, A1-A7 Zoom adjustments of the first zoom microscope 10
B, B1-B7 Zoom adjustments of the second zoom microscope 20
NV, NV1-NV7 Nominal magnifications in the zoom adjustments A1-A7 and B1-B7
RV, RV1-RV9 Actual magnifications of the zoom adjustments A1-A7 and B1-B7
K Coupling function

The invention claimed is:

1. Method for operating a microscope device with a first and a second zoom microscope,
    wherein said first zoom microscope has a first microscope objective and a first specimen plane,
    wherein said second zoom microscope has a second microscope objective and a second specimen plane,
    wherein a first object in said first specimen plane is observed with said first microscope objective,
    wherein a second object in said second specimen plane is observed with said second microscope objective,
    wherein a zoom adjustment of the second zoom microscope is carried out in dependence upon a zoom adjustment of the first zoom microscope,
    wherein
    in order to set a magnification ratio between the first and the second zoom microscopes, the zoom adjustment of the second zoom microscope is automatically carried out on the basis of a coupling function, or
    in order to carry out a size comparison between specimens brought into beam paths of the first and second zoom microscopes, a magnification ratio between a zoom adjustment of the first zoom microscope and the zoom adjustment of the second zoom microscope is determined in dependence upon these zoom adjustments and on the basis of a coupling function,
    wherein, on the basis of the coupling function, an assignment of zoom adjustments of the first zoom microscope to zoom adjustments of the second zoom microscope is produced.

2. Method according to claim 1,
    wherein
    a pair comprising a zoom adjustment of the first zoom microscope and a zoom adjustment of the second zoom microscope, assigned through the coupling function, have coinciding nominal magnifications, respectively.

3. Method according to claim 1,
    wherein
    the coupling function is formed at least using an actual magnification, determined in a calibration measurement, in the case of a zoom adjustment the first zoom microscope, and using an actual magnification, determined in a calibration measurement, in the case of a zoom adjustment of the second zoom microscope.

4. Method according to claim 3,
    wherein
    at least in the case of a pair comprising a zoom adjustment of the first zoom microscope and an assigned zoom adjustment of the second zoom microscope, the actual magnifications, determined in a calibration measurement, coincide.

5. Method according to claim 3,
    wherein
    for at least one zoom adjustment of the first zoom microscope, a deviation between a nominal magnification of this zoom adjustment and an actual magnification of this zoom adjustment is determined, for at least one zoom adjustment of the second zoom microscope, a deviation is determined between a nominal magnification of this zoom adjustment and an actual magnification of this zoom adjustment, in the case of zoom adjustments, assigned to each other through the coupling function, the nominal magnification of a zoom adjustment of the first zoom microscope, corrected by the at least one determined deviation for the first zoom microscope, coincides with the nominal magnification of the assigned zoom adjustment of the second zoom microscope, corrected by the at least one determined deviation for the second zoom microscope.

6. Method according to claim 3,
wherein
a respective nominal magnification is assigned to the zoom adjustments of the two zoom microscopes,
in the case of at least one zoom adjustment of the first zoom microscope and a zoom adjustment of the second zoom microscope, to which the same nominal magnification is assigned, a respective actual magnification is determined in a calibration measurement,
at least one correction factor is formed as a ratio of these actual magnifications,
in case of zoom adjustments, assigned to each other through the coupling function, a nominal magnification of a zoom adjustment of the first zoom microscope and a nominal magnification, modified by the at least one correction factor, of an assigned zoom adjustment of the second zoom microscope coincide.

7. Method according to claim 1,
wherein
a user selects whether the automatic setting of the zoom adjustment of the second zoom microscope is carried out for the adjustment of a magnification ratio, or whether the magnification ratio between the manually carried out zoom adjustments is outputted for size comparison purposes.

8. Method according to claim 3,
wherein
the coupling function is formed using actual magnifications, determined in calibration measurements, in the case of a plurality of zoom adjustments of the first zoom microscope and using actual magnifications, determined in calibration measurements, in the case of a plurality of zoom adjustments of the second zoom microscope.

9. Method according to claim 3,
wherein the calibration measurement comprises:
a) bringing a first object as a measure into a specimen plane of the first zoom microscope,
b) determining an actual magnification for a zoom adjustment of the first zoom microscope through a size determination of an image, which the first object produces in an image plane of the first zoom microscope,
c) bringing a further object as a reference measure into a specimen plane of the second zoom microscope and
d) determining an actual magnification for a zoom adjustment of the second zoom microscope through a size determination of an image, which the further object produces in an image plane of the second zoom microscope.

10. Method according to claim 3,
wherein
a correction ratio is produced through the actual magnification, determined in a calibration measurement, of a zoom adjustment and through a nominal magnification of the same zoom adjustment,
through the coupling function, an assignment of non-calibrated zoom adjustments is produced on the basis of the correction ratio of the calibrated zoom adjustment, of which the nominal magnification has the smallest deviation from the nominal magnification of the non-calibrated zoom adjustment.

11. Method according to claim 1,
wherein
in order to retain a magnification ratio between the zoom microscopes in the case of a manual modification of the zoom adjustment of one of the two zoom microscopes, an automatic modification of the zoom adjustment of the other of the two zoom microscopes takes place on the basis of the coupling function in such a way that a ratio of the actual magnifications between the two zoom microscopes remains constant within 3%, preferably within 1%.

12. Method according to claim 11,
wherein
the determined magnification ratio is predefined by manually carrying out both a zoom adjustment of the first zoom microscope and also a zoom adjustment of the second zoom microscope.

13. Microscope device, having
a first and a second zoom microscope,
wherein said first zoom microscope has a first microscope objective and a first specimen plane,
wherein said second zoom microscope has a second microscope objective and a second specimen plane,
wherein
electronic control means are present and are adapted,
for the purpose of setting a determined magnification ratio between the zoom microscopes, to automatically carry out a zoom adjustment of the second zoom microscope in dependence upon a zoom adjustment of the first zoom microscope and on the basis of a coupling function, or for the purpose of the size comparison between specimens brought into beam paths of the two zoom microscopes, to determine a magnification ratio between zoom adjustments carried out of the two zoom microscopes in dependence upon these zoom adjustments and on the basis of a coupling function,
wherein an assignment of zoom adjustments of the first zoom microscope to zoom adjustments of the second zoom microscope is produced through the coupling function.

14. Device according to claim 13,
wherein
at least one first stepper motor for moving lenses of the first zoom microscope and at least one second stepper motor for moving lenses of the second zoom microscope are present,
the electronic control means is adapted to carry out zoom adjustments according to step tables with the stepper motors, and
through the coupling function, the assignment of zoom adjustments as an assignment of numbers of steps of the first stepper motor to numbers of steps of the second stepper motor is produced.

15. Device according to claim 13,
wherein
the electronic control means is adapted, for the retention of a magnification ratio between the zoom microscopes in case of a change in the zoom adjustment of one of the two zoom microscopes by a user, to carry out an automatic change of the zoom adjustment of the other of the two zoom microscopes on the basis of the coupling function in such a way that a ratio of the actual magnifications between the two zoom microscopes remains constant within 3%, preferably within 1%, and input means are present, with which a user can input a determined magnification ratio.

16. Device according to claim 15, wherein
the electronic control means is adapted to provide a user with a selection of operating modes for retaining a determined magnification ratio, wherein in one operating mode the determined magnification ratio takes place through input via the input means and in another operating mode the determined magnification ratio takes place by manually carrying out a zoom adjustment of the first zoom microscope and a zoom adjustment of the second zoom microscope.

* * * * *